(12) United States Patent
Malladi et al.

(10) Patent No.: US 8,855,064 B2
(45) Date of Patent: Oct. 7, 2014

(54) BUNDLED FREQUENCY DIVISION MULTIPLEXING STRUCTURE IN WIRELESS COMMUNICATIONS

(75) Inventors: Durga Prasad Malladi, San Diego, CA (US); Hao Xu, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 13/004,614

(22) Filed: Jan. 11, 2011

(65) Prior Publication Data

US 2012/0020309 A1 Jan. 26, 2012

Related U.S. Application Data

(60) Provisional application No. 61/294,351, filed on Jan. 12, 2010.

(51) Int. Cl.
*H04W 4/00* (2009.01)
*H04W 72/04* (2009.01)
*H04L 5/00* (2006.01)

(52) U.S. Cl.
CPC ........ *H04W 72/0446* (2013.01); *H04W 72/042* (2013.01); *H04L 5/003* (2013.01)
USPC ............................. 370/329; 370/310; 370/330

(58) Field of Classification Search
USPC ......... 370/329, 330, 336, 208, 252, 294, 335, 370/216, 241; 455/450; 714/748
See application file for complete search history.

(56) References Cited

U.S. PATENT DOCUMENTS 8,379,588 B2 * 2/2013 Lee et al. ...................... 370/329
(Continued)

FOREIGN PATENT DOCUMENTS

JP 2010515332 A 5/2010
JP 2010530709 A 9/2010
(Continued)

OTHER PUBLICATIONS

Alcatel-Lucent: "RAN2 aspects of the solutions for Subframe Bundling" 3GPP Draft; R2-081446 Subframe Bundling RAN2 Issues, 3rd Generation Partnership Project (3GPP), Mobile Competence Centre; 650, Route Des Lucioles; F-06921 Sophia-Antipolis Cedex ; France, vol. RAN WG2, no. Shenzhen, China; Mar. 25, 2008, XP050139195 [retrieved on Mar. 25, 2008] the whole document.

(Continued)

*Primary Examiner* — Abdullah Riyami
(74) *Attorney, Agent, or Firm* — Paul Kuo

(57) ABSTRACT

Methods and apparatuses are provided that facilitate allocating a portion of a resource block to a power-limited device for communicating therewith. The power-limited device may not be capable of transmitting over an entire resource block due to power limitations; thus, a portion of the resource block can be assigned thereto, allowing for allocating at least a different portion of the resource block to at least one different device to optimize communications over the resource block. In addition, the portion of the resource block can be allocated across one or more bundled time transmit intervals (TTI) to allow for effective communication of time-sensitive data, such as voice over internet protocol (VoIP).

25 Claims, 13 Drawing Sheets

(56) References Cited

U.S. PATENT DOCUMENTS

| | | | |
|---|---|---|---|
| 2007/0171864 A1* | 7/2007 | Zhang et al. | 370/329 |
| 2008/0013599 A1* | 1/2008 | Malladi | 375/132 |
| 2008/0095110 A1* | 4/2008 | Montojo et al. | 370/330 |
| 2008/0175195 A1* | 7/2008 | Cho et al. | 370/329 |
| 2008/0225822 A1* | 9/2008 | Zhang et al. | 370/343 |
| 2008/0240030 A1* | 10/2008 | Kolding et al. | 370/329 |
| 2009/0016372 A1* | 1/2009 | Tao et al. | 370/437 |
| 2009/0257408 A1* | 10/2009 | Zhang et al. | 370/336 |
| 2009/0262699 A1* | 10/2009 | Wengerter et al. | 370/330 |
| 2010/0067461 A1* | 3/2010 | Kwak et al. | 370/329 |
| 2010/0098010 A1* | 4/2010 | Kuo | 370/329 |
| 2010/0118825 A1 | 5/2010 | Kawamura et al. | |
| 2010/0128687 A1* | 5/2010 | Oteri et al. | 370/329 |
| 2010/0192035 A1* | 7/2010 | Sagfors et al. | 714/748 |
| 2010/0195614 A1* | 8/2010 | Nimbalker et al. | 370/330 |
| 2011/0032895 A1* | 2/2011 | Englund et al. | 370/329 |
| 2011/0039569 A1* | 2/2011 | Narasimha et al. | 455/452.2 |
| 2011/0044277 A1* | 2/2011 | Moulsley et al. | 370/329 |
| 2011/0075611 A1* | 3/2011 | Choi | 370/329 |
| 2011/0085491 A1* | 4/2011 | Tynderfeldt et al. | 370/315 |
| 2011/0141878 A1* | 6/2011 | Che et al. | 370/216 |
| 2011/0141952 A1* | 6/2011 | Wang et al. | 370/294 |
| 2011/0280212 A1* | 11/2011 | Lv | 370/329 |
| 2012/0002568 A1* | 1/2012 | Tiirola et al. | 370/252 |

FOREIGN PATENT DOCUMENTS

| | | |
|---|---|---|
| WO | 2008085000 A1 | 7/2008 |
| WO | 2008156414 A2 | 12/2008 |
| WO | 2009/118621 A2 | 10/2009 |
| WO | 2009126902 A2 | 10/2009 |
| WO | 2010/112936 A1 | 10/2010 |

OTHER PUBLICATIONS

Catt: "TTI bundling Configuration", 3GPP Draft; R2-082317 TTI Bundling Configuration, 3rd Generation Partnership Project (3GPP), Mobile Competence Centre ; 650, Route Des Lucioles ; F-06921 Sophia-Antipolis Cedex ; France, vol. RAN WG2, no. Kansas City, USA, Apr. 29, 2008, XP050140061, [retrieved on Apr. 29, 2008].

Ericsson: "Evaluation of TTI-Bundling Alternatives" 3GPP Draft, R2-081465 Evaluation of TTI-Bundling Alternatives, 3rd Generation Partnership Project (3GPP), Mobile Competence Centre ; 650, Route Des Lucioles ; F-06921 Sophia-Antipolis Cedex ; France, vol. RAN WG2, no. Shenzhen, China; Mar. 25, 2008, XP050139209 [retrieved on Mar. 25, 2008] the whole document.

Ericsson: "Text Proposal for TTI bundling" 3GPP Draft, R2-081466 TTI-Bundling_MAC Text Proposal, 3rd Generation Partnership Project (3GPP), Mobile Competence Centre; 650, Route Des Lucioles; F-06921 Sophia-Antipolis Cedex ; France, vol. RAN WG2, no. Shenzhen, China; Mar. 25, 2008, XP050139210 [retrieved on Mar. 25, 2008] the whole document.

Ericsson: "Text Proposal for TTI bundling" 3GPP Draft, R2-082149 TTI-Bundling_MAC Text Proposal, 3rd Generation Partnership Project (3GPP), Mobile Competence Centre; 650, Route Des Lucioles; F-06921 Sophia-Antipolis Cedex; France, vol. RAN WG2, no. Kansas City, May 5-9, 2008, USA; Apr. 29, 2008, XP050139928 [retrieved on Apr. 29, 2008] the whole document.

Ericsson: "TTI-Bundling Considerations for TDD", 3GPP Draft; R2-082148 TTI-Bundling Considerations for TDD, 3rd Generation Partnership Project (3GPP), Mobile Competence Centre; 650, Route Des Lucioles ; F-06921 Sophia-Antipolis Cedex ; France, vol. RAN WG2, no. Kansas City, USA; Apr. 28, 2008, XP050139927, [retrieved on Apr. 28, 2008].

International Search Report and Written Opinion—PCT/US2011/021023—ISA/EPO—Apr. 27, 2011.

* cited by examiner

BUNDLED FREQUENCY DIVISION MULTIPLEXING STRUCTURE IN WIRELESS COMMUNICATIONS

CLAIM OF PRIORITY UNDER 35 U.S.C. §119

The present application for patent claims priority to Provisional Application No. 61/294,351 entitled "BUNDLED FDM STRUCTURE FOR LTE VOIP," filed Jan. 12, 2010, and assigned to the assignee hereof and hereby expressly incorporated by reference herein.

BACKGROUND

1. Field

The following description relates generally to wireless network communications, and more particularly to assigning and/or utilizing transmission resources.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, in some releases of LTE, such as release 8 and release 9, communication resources are assigned using time division multiplexing, such that a base station assigns a resource block, which can include a number resource elements (or subcarriers) over a given 1 millisecond (ms) time transmit interval (TTI), such as a subframe, or portion thereof to a device. To allow for receiving hybrid automatic repeat/request (HARQ) feedback at the device for a given transmission, the device can subsequently be assigned an additional resource block at least 8 TTIs (e.g., 8 ms) later. Where a device is power-limited, however, it may not be able to utilize the entire resource block for transmitting, though it is assigned the entire resource block. Additionally, in this regard, the power-limited device transmits at a decreased data rate due to power limitation, which can pose problems for time-sensitive communications, such as voice over internet protocol. Moreover, some solutions have proposed assigning resource blocks in TTI bundles to a power-limited device for time-sensitive communications to allow the device to transmit at a certain data rate.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating allocating a portion of a resource block to a power-limited device over one or more time transmit intervals (TTI), which can be a subframe for example. Other portions of the resource block can be allocated to other power-limited devices to optimize bandwidth utilization within the resource block. In addition, in one example, TTIs can be bundled, and a power-limited device can be assigned multiple TTIs for utilizing a portion of a resource block, along with other power-limited devices that can utilize different portions of the resource block over the bundled TTIs.

According to an example, a method for communicating over allocated resources is provided that includes receiving a resource allocation comprising a portion of a resource block over a plurality of bundled TTIs. The method further includes transmitting signals over the portion of the resource block in the plurality of bundled TTIs according to the resource allocation.

In another aspect, an apparatus for communicating over allocated resources is provided that includes at least one processor configured to obtain a resource allocation comprising a portion of a resource block over a plurality of bundled TTIs. The at least one processor is further configured to transmit signals over the portion of the resource block in the plurality of bundled TTIs according to the resource allocation. In addition, the apparatus includes a memory coupled to the at least one processor.

In yet another aspect, an apparatus for communicating over allocated resources is provided that includes means for receiving a resource allocation comprising a portion of a resource block over a plurality of bundled TTIs. The apparatus further includes means for transmitting signals over the portion of the resource block in the plurality of bundled TTIs according to the resource allocation.

Still, in another aspect, a computer-program product is provided for communicating over allocated resources including a computer-readable medium having code for causing at least one computer to obtain a resource allocation comprising a portion of a resource block over a plurality of bundled TTIs. The computer-readable medium further includes code for causing the at least one computer to transmit signals over the portion of the resource block in the plurality of bundled TTIs according to the resource allocation.

Moreover, in an aspect, an apparatus for communicating over allocated resources is provided that includes a resource allocation receiving component for obtaining a resource allocation comprising a portion of a resource block over a plurality of bundled TTIs. The apparatus further includes a transmitting component for transmitting signals over the portion of the resource block in the plurality of bundled TTIs according to the resource allocation.

According to another example, a method for allocating resources to one or more devices is provided including determining a portion of a resource block for allocating to a device in at least one of one or more bundled TTIs and transmitting an indication of the portion of the resource block to the device.

In another aspect, an apparatus for allocating resources to one or more devices is provided that includes at least one processor configured to determine a portion of a resource block for allocating to a device in at least one of one or more bundled TTIs. The at least one processor is further configured to transmit an indication of the portion of the resource block to the device. In addition, the apparatus includes a memory coupled to the at least one processor.

In yet another aspect, an apparatus for allocating resources to one or more devices is provided that includes means for determining a portion of a resource block for allocating to a device in at least one of one or more bundled TTIs. The apparatus further includes means for transmitting an indication of the portion of the resource block to the device.

Still, in another aspect, a computer-program product is provided for allocating resources to one or more devices including a computer-readable medium having code for causing at least one computer to determine a portion of a resource block for allocating to a device in at least one of one or more bundled TTIs. The computer-readable medium further includes code for causing the at least one computer to transmit an indication of the portion of the resource block to the device.

Moreover, in an aspect, an apparatus for allocating resources to one or more devices is provided that includes a resource allocation determining component for determining a portion of a resource block for allocating to a device in at least one of one or more bundled TTIs. The apparatus further includes a resource allocating component for transmitting an indication of the portion of the resource block to the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
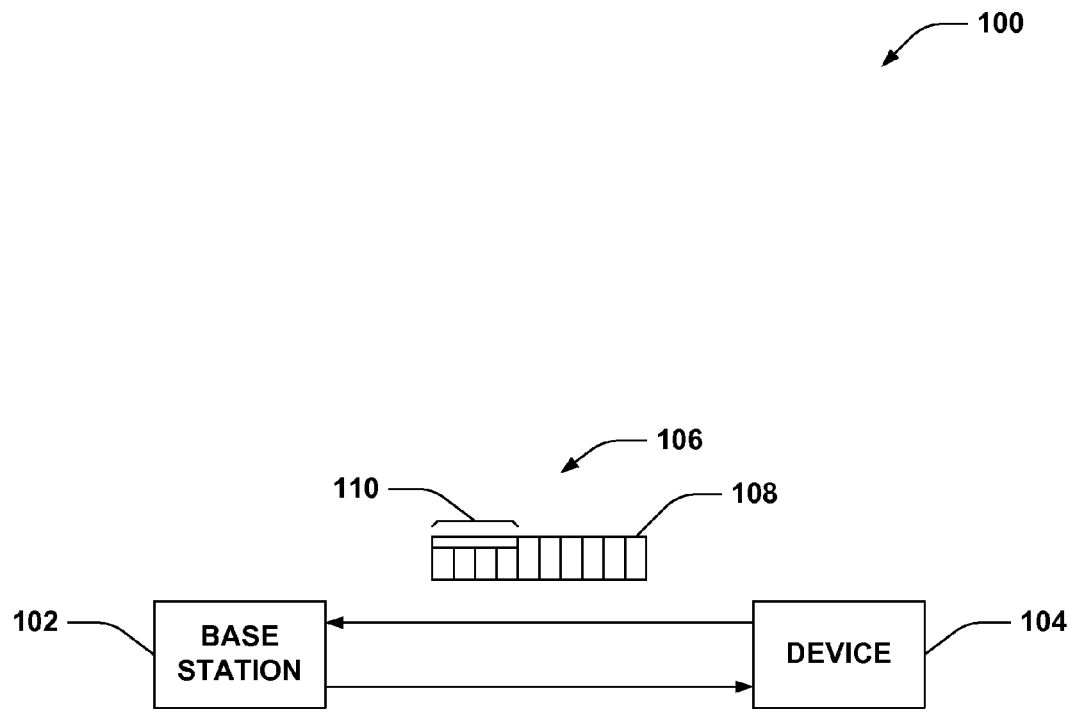
FIG. 1 illustrates an example system for utilizing a portion of a resource block for communicating in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, devices in LTE can be allocated and can utilize portions of a resource block for transmitting signals over one or more time transmit intervals (TTI). For example, the devices can be power-limited, which can mean the devices do not have enough power to transmit signals using the frequency of an entire resource block. Thus, a plurality of such power-limited devices, can be allocated separate portions of a given resource block within a given TTI, or portion thereof, for transmitting one or more signals. In addition, the power-limited devices can be allocated portions of a similar or other resource block in one or more subsequent consecutive TTIs, or portions thereof. Moreover, devices can be allocated portions of a resource block that are different within the given resource block within a given TTI, for each of a plurality of TTIs, and/or the like, according to a hopping pattern to provide transmission diversity. As compared to current LTE resource allocation, though a smaller portion of frequency is allocated to the device in aspects described herein, bundling the frequency over multiple TTIs can allow transmission of additional data over a period of time, and in any case, the device may not be able to use the entire frequency in a given TTI due to power limitation, so assigning only a portion of the resource block may not have a large impact on device communications.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that facilitates allocating a portion of one or more resource blocks to a device for uplink transmissions. System 100 includes a base station 102 that communicates with a device 104 (e.g., to provide access to a wireless network). Base station 102 can be a macrocell, femtocell, picocell, or similar base station, a relay node, a mobile base station, a device communicating in peer-to-peer or ad-hoc mode, a portion thereof and/or the like. Device 104 can be a UE, modem (or other tethered device), a portion thereof, and/or the like. For example, device 104 can establish a connection with base station 102 (e.g., by random access or similar procedure) and can receive a resource allocation from base station 102 for communicating signals thereto.

For example, the resource allocation can relate to a portion of time and frequency resources over a data channel that can be shared among a plurality of devices communicating with base station 102, such as a physical uplink shared channel (PUSCH) in LTE. In LTE, for example, base station 102 can allocate at least one resource block in at least one TTI to each device for transmitting signals to the base station. A TTI can be a subframe that spans 1 millisecond (ms) in the time domain, and a radio frame can include 10 subframes, and can thus span 10 ms. Further, each TTI or subframe can have two 0.5 ms slots, comprising 6 or 7 data symbols (e.g., SC-FDMA symbols) each, depending on a cyclic prefix utilized by the base station 102. In addition, base station 102 can allow 8 ms between resource allocations for device 104 to transmit feedback to the device 104. Thus, in many configurations, device 104 is assigned a resource block in every 8 subframes (e.g., or 8 ms) for transmitting to base station 102 over a PUSCH. Moreover, a resource block can comprise a number of subcarriers in the frequency domain over the data symbols of a slot or subframe. For example, the resource block can include a set of 12 subcarriers over the data symbols in the slot or subframe. In addition, each subcarrier can comprise substantially 15 kilohertz (kHz) of frequency bandwidth, such that the resource block can comprise 180 kHz.

Where device 104 is power-limited, it may not be able to utilize the entire resource block for transmitting. In this regard, base station 102 can allocate, and device 104 can transmit over, a portion of a resource block (e.g., one or more subcarriers in the resource block) in one or more TTIs. As depicted, device 104 can transmit signals to base station 102 in a radio frame 106. As described, radio frame 106 can include 10 resource blocks over 10 TTIs 108. Base station 102 can allocate a frequency portion of resource blocks (e.g., a fraction of the subcarriers) over bundled TTIs 110 to device 104, and device can transmit signals over the portion of the resource blocks during the bundled TTIs 110. In this regard, device 104 transmits over limited bandwidth for a period of time. Base station 102 can similarly allocate other portions of the resource blocks during the bundled TTIs to other power-limited devices to optimize the allocated bandwidth.

Thus, device 104 can transmit signals to base station 102 using a smaller portion of frequency due to power limitations, but over multiple bundled TTIs to effectively communicate at a higher data rate for time-sensitive applications, such as voice over internet protocol (VoIP) or other streaming. In one example, it is to be appreciated that allowing 4 power-limited devices to transmit over different portions of the same resource block during 4 bundled TTIs can be beneficial over allocating one of four entire resource blocks to each of the power-limited devices since the power-limited devices cannot use the entire bandwidth of the resource block.

Figure 2:
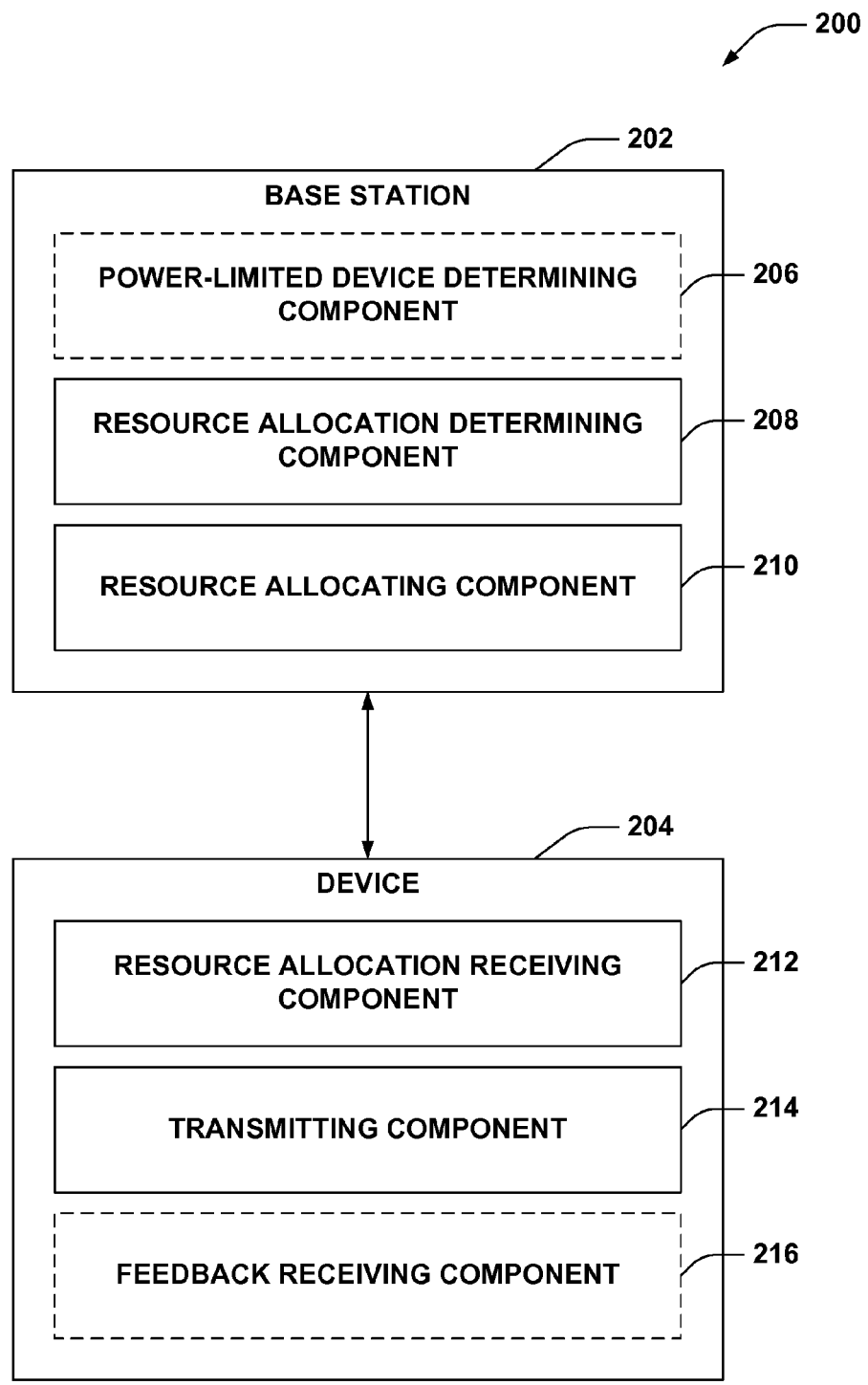
FIG. 2 illustrates an example system for allocating a portion of a resource block to a device for communicating therewith.

Turning to FIG. 2, an example wireless communication system 200 is illustrated that facilitates allocating resources to one or more power-limited devices. System 200 includes a base station 202 that wirelessly communicates with a device 204 (e.g., to provide wireless network access thereto). Base station 202 can be a macrocell, femtocell, picocell, or similar base station, a relay node, mobile base station, device in peer-to-peer or ad-hoc mode, a portion thereof, etc., and device 204 can be a UE, modem, a portion thereof, etc. Moreover, base station 202 can comprise an optional power-limited device determining component 206 for discerning whether one or more devices communicating with base station 202 are power-limited, a resource allocation determining component 208 for selecting a portion of resources for allocating to the one or more devices, and a resource allocating component 210 for communicating the resource allocation to the one or more devices. Device 204 can comprise a resource allocation receiving component 212 for obtaining a resource allocation from a base station, a transmitting component 214 for communicating with the base station over the allocated resources, and an optional feedback receiving component 216 that obtains feedback from the base station related to communicating over the allocated resources.

According to an example, resource allocation determining component 208 can determine resources to allocate to device 204 based at least in part on one or more aspects of the device 204 or other devices. In one example, power-limited device determining component 206 can discern whether device 204 is power-limited. This can include, for example, receiving an indication of power limitation from the device 204, receiving an indication from a network or one or more other devices (not shown), and/or the like. In yet another example, power-limited device determining component 206 can determine that device 204 is power-limited based at least in part on one or more properties measured from previous communications therewith, such as signal strength, and/or the like. Where power-limited device determining component 206 determines device 204 is power-limited, or otherwise, resource allocation determining component 208 can determine an allocation for the device 204 comprising a portion of a resource block over one or more bundled TTIs. In one example, resource allocation determining component 208 can determine a size of the portion of the resource block based at least in part on the degree to which the device is power-limited. For example, this can include determining a maximum number of subcarriers over which a device can transmit in a given period of time, and allocating a portion of the resource block according to the number of subcarriers. In any case, as described, resource allocation determining component 208 can additionally determine allocations for other devices in other portions of the resource block over at least a portion of the one or more bundled TTIs.

In addition, for example, for device 204, resource allocation determining component 208 can select a different portion of the resource block or another portion of a different resource block in one of the one or more bundled TTIs than in another one of the bundled TTIs for inter-TTI hopping to provide transmission diversity. In another example, resource allocation determining component 208 can select a different portion of the resource block or another portion of a different resource block within at least one of the TTIs (e.g., a different portion of the resource block in each slot of the TTI) for device 204 to provide intra-TTI hopping for additional or alternative frequency diversity. In addition, resource allocation determining component 208 can select a different portion of a resource block or a portion of a different resource block for device 204 in one or more radio frames.

In these examples, resource allocating component 210 can indicate the resource allocations to device 204. Resource allocation receiving component 212 can obtain the specified resource allocations, and transmitting component 214 can communicate with the base station 202 over the allocated resources. Thus, for example, resource allocation receiving component 212 can obtain a resource allocation comprising a portion of a resource block in one or more bundled TTIs, and transmitting component 214 can transmit signals to the base station 202 using the portion of the resource block over the one or more bundled TTIs. As described, the resource allocation receiving component 212 can obtain resource allocations that hop over different portions of a given subframe within a TTI, between a plurality of the one or more bundled TTIs, over radio frames, etc.

Moreover, for example, resource allocation determining component 208 can optionally select resources over which to communicate feedback to device 204 regarding the transmissions received over the portion of one or more subframes allocated to device 204. For example, since resource allocation determining component 208 can assign different portions of a resource block to multiple devices, resource allocation determining component 208 can select feedback resources for each of the portion of one or more subframes. In one example, resource allocation determining component 208 can select a subsequent resource block in a subframe for transmitting feedback to the device 204, where feedback for multiple devices can each be transmitted over a subchannel in the resource block. In another example, resource allocation determining component 208 can map resource blocks in adjacent subframes to each of the multiple devices (or related resource allocations) for transmitting feedback thereto, as described further herein. Resource allocating component 210 can communicate an indication of the feedback resources to device 204, and resource allocation receiving component 212 can obtain the feedback resource indication. Feedback receiving component 216, in this example, can accordingly monitor the indicated feedback resources for receiving feedback from base station 202.

Figure 3:
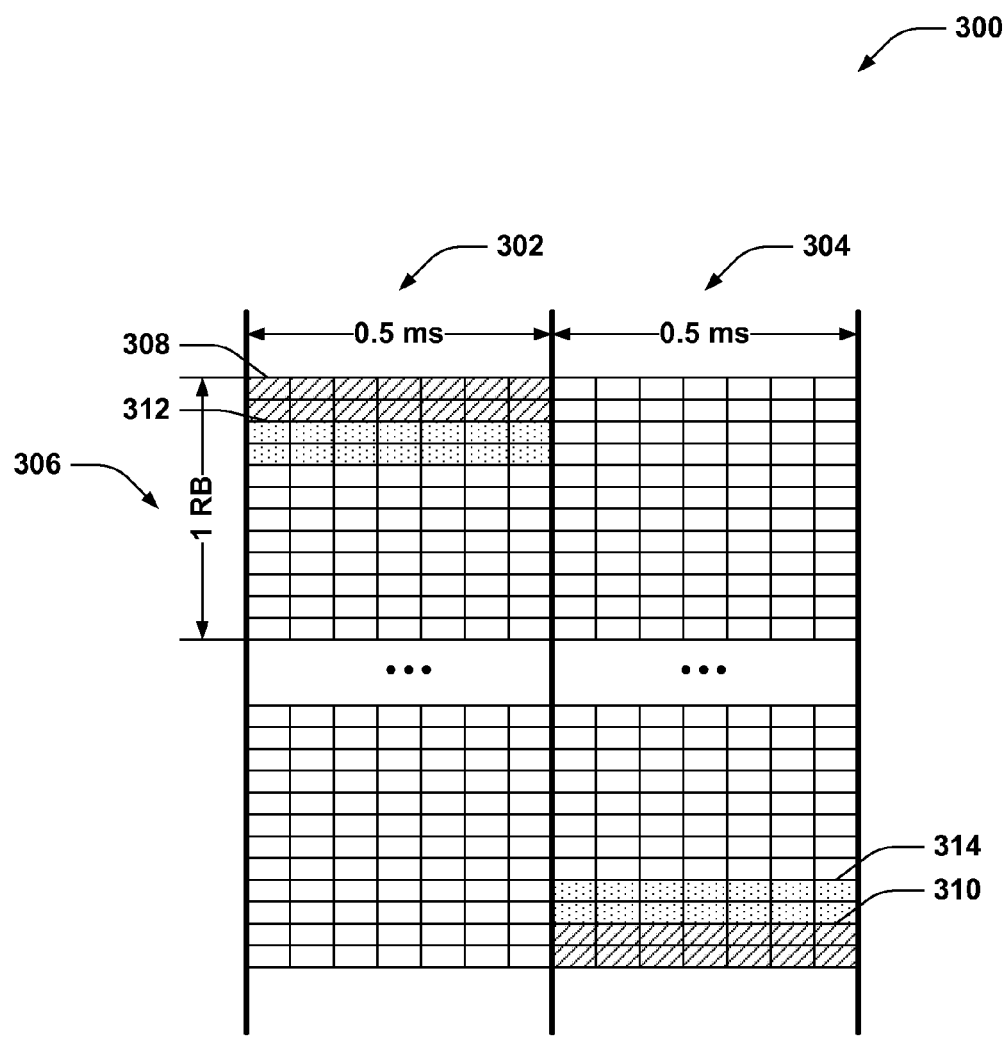
FIG. 3 illustrates an example portion of bandwidth related to allocating a portion of a resource block.

Referring to FIG. 3, illustrated is an example portion of communication bandwidth 300 related to aspects described herein. For example, bandwidth 300 can relate to a resource allocation defined by a base station and/or utilized by a device. Bandwidth 300 includes two slots 302 and 304 that can form a TTI. As described, in LTE, each slot 302 and 304 has 7 data symbols for normal cyclic prefix (e.g., or can have 6 data symbols for extended cyclic prefix) and is 0.5 ms. In addition, a resource block 306 is shown in each slot. As described, the resource block can comprise 12 subcarriers over one or both slots. In bandwidth 300, a portion of resource block 306 in slot 302 can be assigned to a power-limited device, which can include the subcarriers 308 that are indicated in the similarly lined boxes over slot 302. In addition, in slot 304, the subcarriers 310 can be assigned to the power-limited device, and thus the resources assigned to the power-limited device hop to a different resource block between slots of the TTI (e.g., intra-TTI hopping). It is to be appreciated, in another example, that the assigned resources can alternatively hop within the resource block 306 between the slots. Similarly, subcarriers 312 and similarly dotted boxes can over subcarrier 302 can be assigned to a different power-limited device for transmitting to a base station; subcarriers 314 can be assigned to the different power-limited device in slot 304 illustrating intra-TTI hopping.

Figure 4:
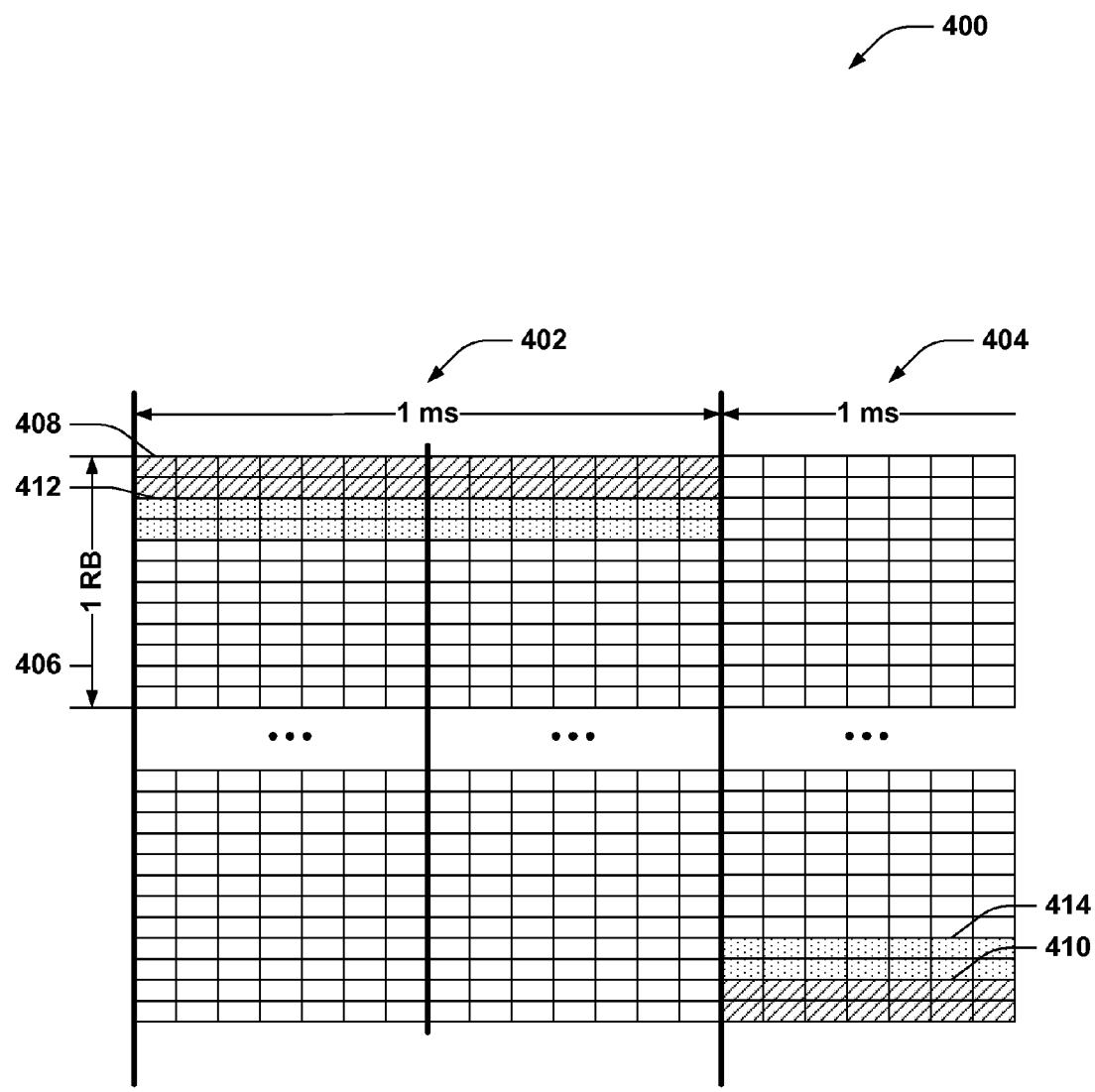
FIG. 4 illustrates an example portion of bandwidth related to allocating a portion of a resource block to one or more devices.

Referring to FIG. 4, illustrated is an example portion of communication bandwidth 400 related to aspects described herein. For example, bandwidth 400 can relate to a resource allocation defined by a base station and/or utilized by a device. Bandwidth 400 includes two 1 ms TTIs 402 and 404. As described, in LTE, the TTIs 402 and 404 can be subframes comprising two slots each (though only one is shown for TTI 404) with 7 data symbols in each slot. In addition, a resource block 406 is shown in each slot. As described, the resource block can comprise 12 subcarriers over each TTI 402 and 404. In bandwidth 400, a portion of resource block 406 in TTI 402 can be assigned to a power-limited device, which can include the subcarriers 408 that are indicated in the similarly lined boxes over TTI 402. In addition, in TTI 404, the subcarriers 410 can be assigned to the power-limited device, and thus the resources assigned to the power-limited device hop in different TTIs (e.g., inter-TTI hopping). It is to be appreciated that the assigned resources can alternatively hop within the resource block between the TTIs. Similarly, subcarriers 412 and similarly dotted boxes can over subcarrier 402 can be assigned to a different power-limited device for transmitting to a base station; subcarriers 414 can be assigned to the different power-limited device in TTI 404 illustrating inter-TTI hopping.

Figure 5:
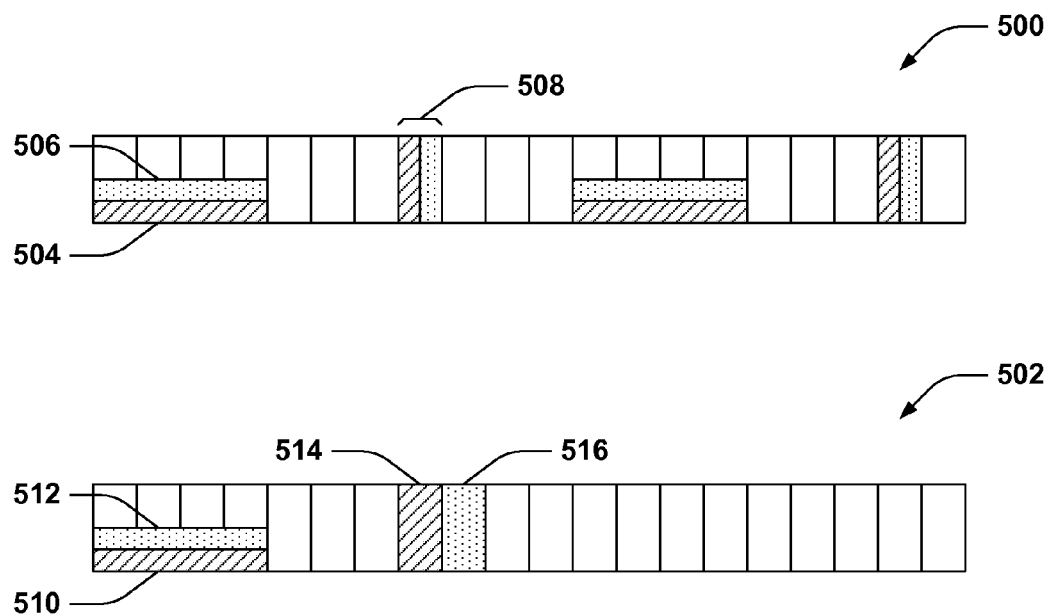
FIG. 5 illustrates example sets of resource blocks according to aspects described herein.

Turning to FIG. 5, example sets of resource blocks 500 and 502 are illustrated in accordance with aspects described herein. For example, resource blocks 500 illustrate an example resource allocation defined by a base station and/or utilized by one or more devices communicating therewith. Resource blocks 500 can each be over a TTI, as described above. Resource blocks 500 include a portion of a resource block over a plurality of bundled TTIs 504 that can be allocated to a power-limited device, and a similar portion of the resource block 506 that can be allocated to a different power-limited device. In this example, the base station can also assign TTI 508 to the device and different device for receiving feedback regarding the portions of the resource block 504 and 506 from the base station. In one example, the base station can assign subchannels over the TTI 508 over which to send feedback. In another example, the base station can assign a similar portion of the resource block in TTI 508 as for the resource allocation for receiving feedback.

TTIs 502 can similarly include a portion of a resource block over a plurality of bundled TTIs 510 that can be allocated to a power-limited device, and a similar portion of a resource block 512 that can be allocated to a different power-limited device. In this example, the base station can allocate TTI 514 to the device for receiving feedback regarding the portion of the resource block 512 from the base station, and TTI 516 to the different device for receiving feedback regarding the portion of the resource block 512. For example, where there are two additional portions of the resource block assigned to other devices and two corresponding additional subsequent TTIs allocated for feedback, the base station can comply with the 8 ms feedback requirement in LTE, as described above, assigning portions of a subsequent resource block to the devices.

Figure 6:
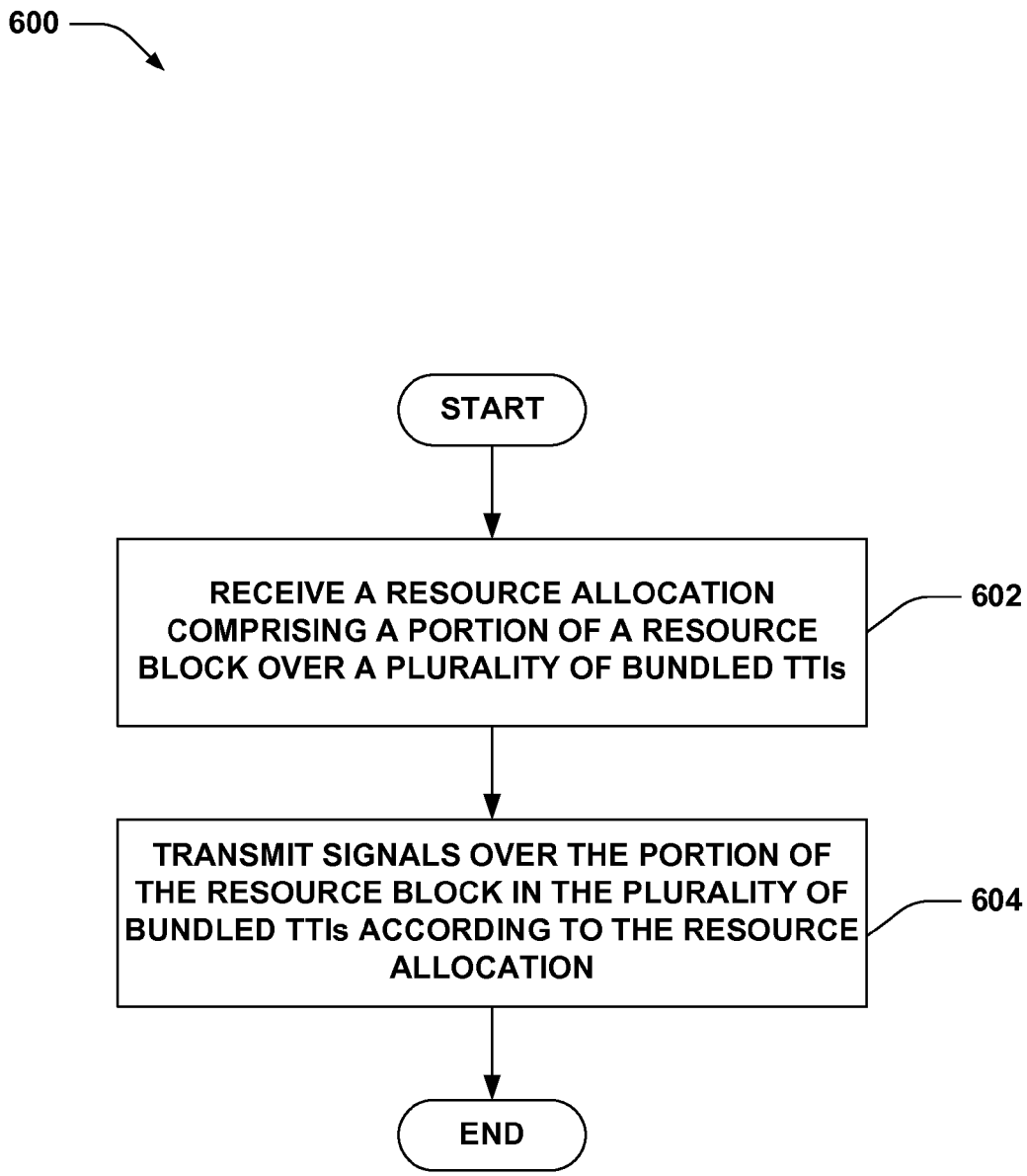
FIG. 6 illustrates an example methodology that utilizes a portion of a resource block for transmitting signals.
Figure 7:
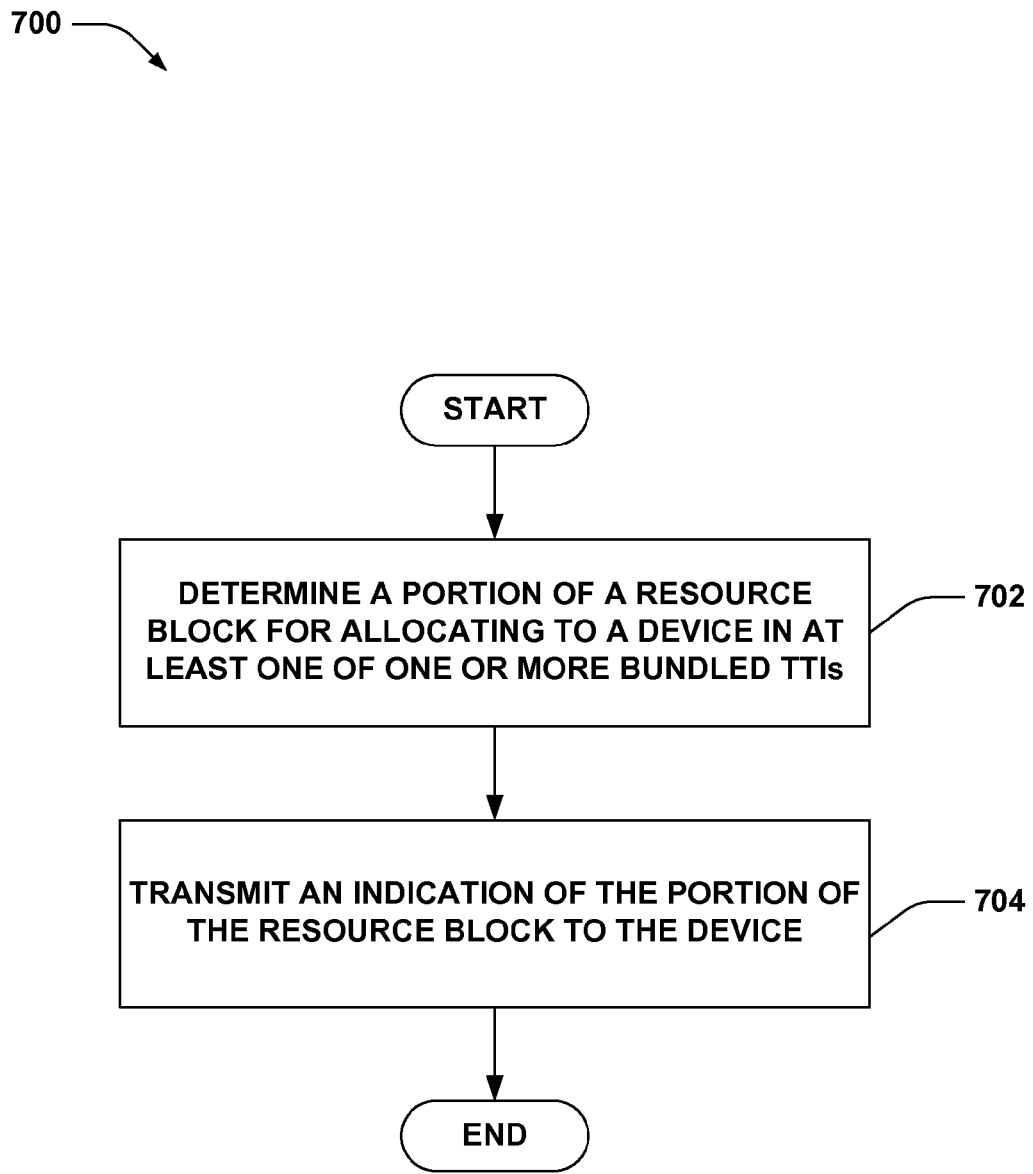
FIG. 7 illustrates an example methodology that allocates a portion of a resource block to a device.

Referring to FIGS. 6-7, example methodologies relating to allocating a portion of a resource block to a device are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 6, an example methodology 600 is displayed that facilitates utilizing a portion of a resource block for communicating in a wireless network. At 602, a resource allocation comprising a portion of a resource block over a plurality of bundled TTIs can be received. For example, the portion of the resource block can correspond to one or more subcarriers in LTE across data symbols in the bundle of TTIs. At 604, signals can be transmitted over the portion of the resource block in the plurality of bundled TTIs according to the resource allocation. As described, for example, additional devices can utilize other portions of the subcarrier.

Turning to FIG. 7, an example methodology 700 that facilitates allocating a portion of a resource block to a device is illustrated. At 702, a portion of a resource block can be determined for allocating to a device in at least one of one or more bundled TTIs. As described, the portion of the resource block can relate to one or more subcarriers in LTE across one or more data symbols in one or more bundled TTIs. At 704, an indication of the portion of the resource block can be transmitted to the device. As described, an indication of retransmission feedback resources related to the portion of the resource block can also be transmitted to the device.

It will be appreciated that, in accordance with one or more aspects described herein, inferences can be made regarding determining whether a device is power-limited, determining a portion of a resource block to allocate to a device in one or more bundled TTIs, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
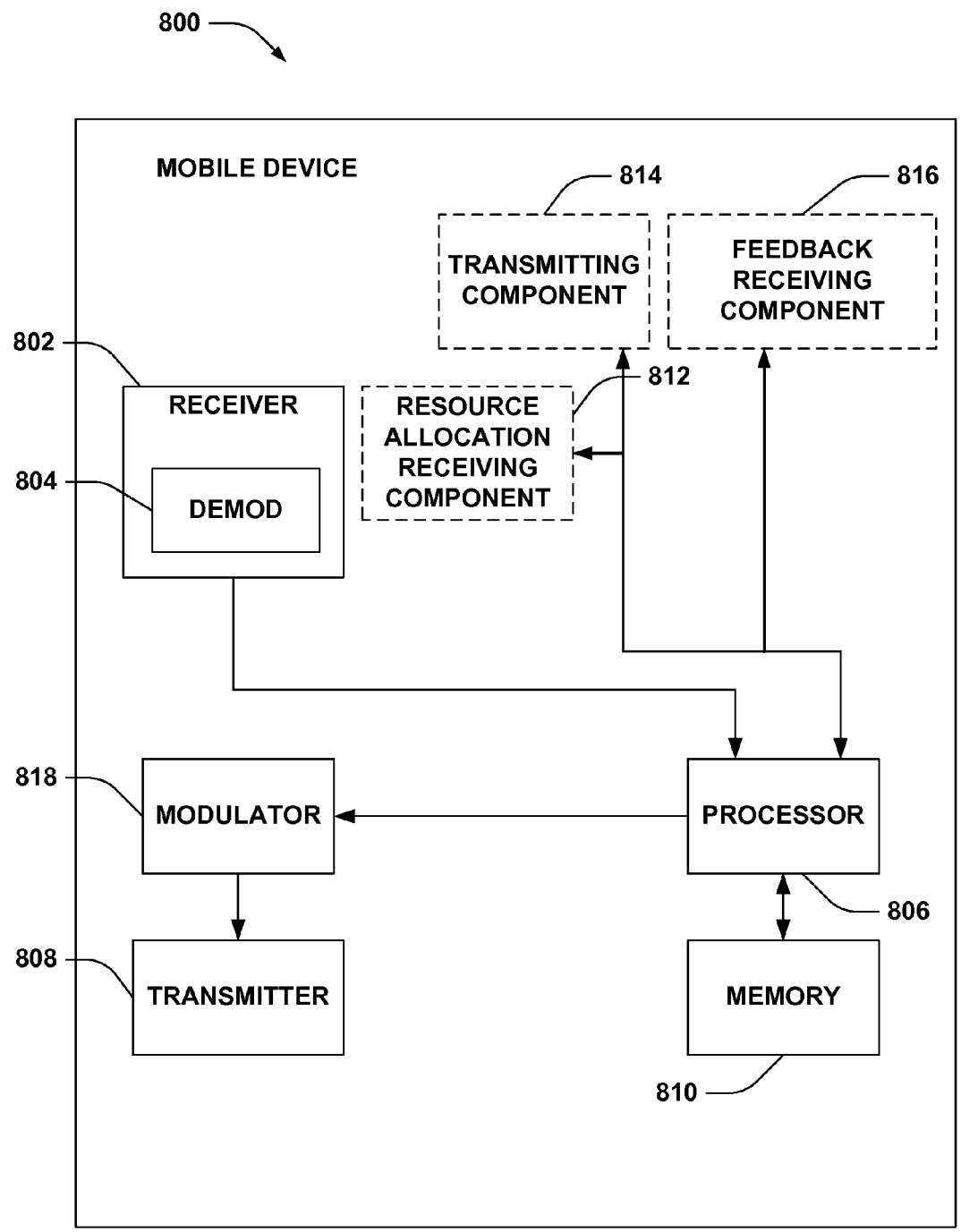
FIG. 8 illustrates an example mobile device that transmits signals over an allocated portion of a resource block.

FIG. 8 is an illustration of a mobile device 800 that facilitates utilizing an allocated portion of a resource block for communicating with a base station. Mobile device 800 comprises a receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can comprise a demodulator 804 that can demodulate received symbols and provide them to a processor 806 for channel estimation. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800.

Mobile device 800 can additionally comprise memory 810 that is operatively coupled to processor 806 and that can store data to be transmitted, received data, information related to available channels, data associated with analyzed signal and/ or interference strength, information related to an assigned channel, power, rate, or the like, and any other suitable information for estimating a channel and communicating via the channel. Memory 810 can additionally store protocols and/or algorithms associated with estimating and/or utilizing a channel (e.g., performance based, capacity based, etc.).

It will be appreciated that the data store (e.g., memory 810) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 810 of the subject systems and methods is intended to comprise, without being limited to, these and any other suitable types of memory.

Processor 806 can further be optionally operatively coupled to resource allocation receiving component 812, which can be similar to resource allocation receiving component 212, a transmitting component 814, which can be similar to transmitting component 214, and a feedback receiving component 816 that can be similar to feedback receiving component 216. Mobile device 800 still further comprises a modulator 818 that modulates signals for transmission by transmitter 808 to, for instance, a base station, another mobile device, etc. Although depicted as being separate from the processor 806, it is to be appreciated that the resource allocation receiving component 812, transmitting component 814, feedback receiving component 816, demodulator 804, and/or modulator 818 can be part of the processor 806 or multiple processors (not shown).

Figure 9:
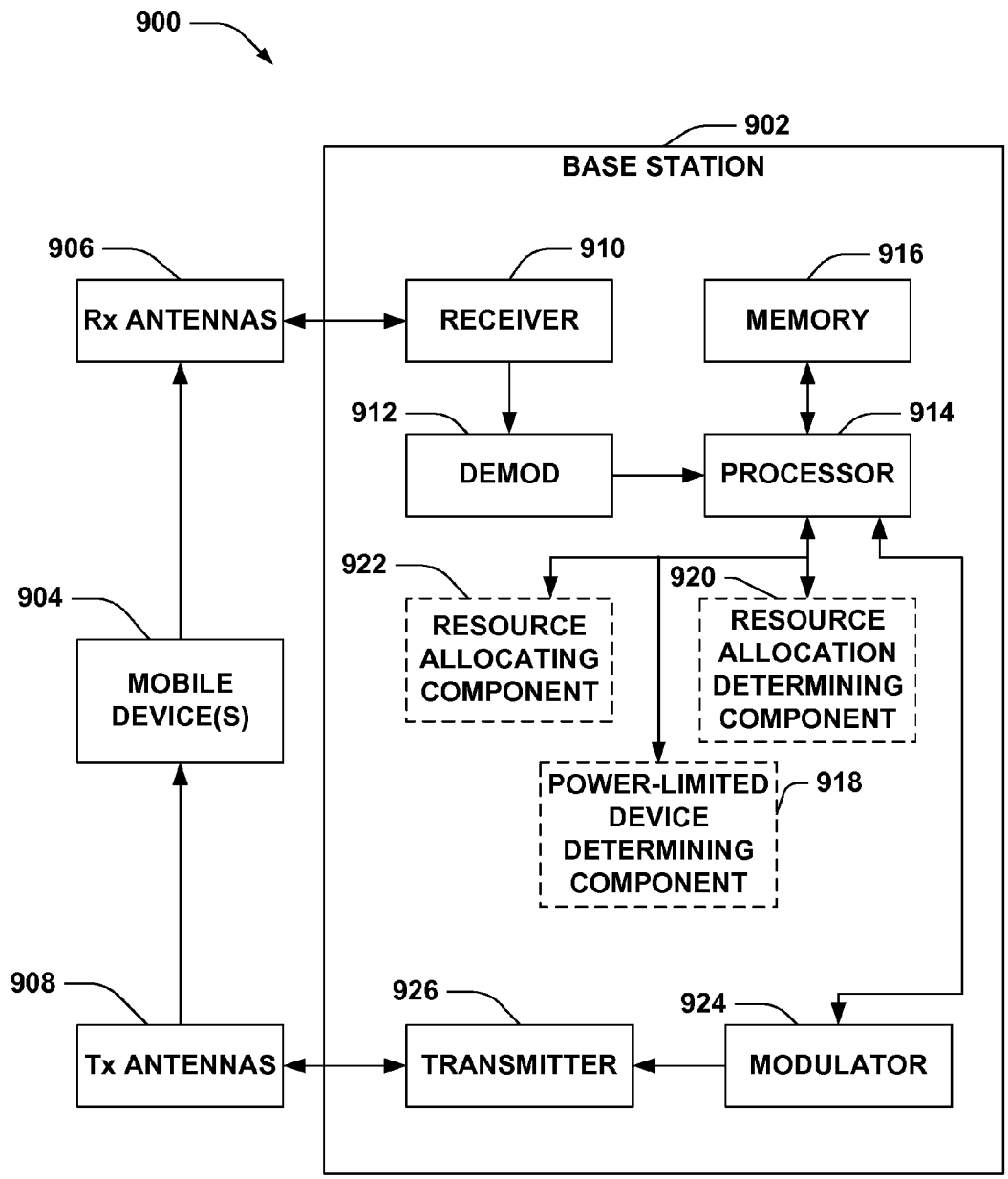
FIG. 9 illustrates an example system that facilitates allocating a portion of a resource block to a device.

FIG. 9 is an illustration of a system 900 that facilitates allocating a portion of a resource block to a device for receiving communications therefrom. System 900 comprises a base station 902, which can be substantially any base station (e.g., a small base station, such as a femtocell, picocell, etc., relay node, mobile base station . . . ) having a receiver 910 that receives signal(s) from one or more mobile devices 904 through a plurality of receive antennas 906 (e.g., which can be of multiple network technologies, as described), and a transmitter 926 that transmits to the one or more mobile devices 904 through a plurality of transmit antennas 908 (e.g., which can be of multiple network technologies, as described). In addition, in one example, transmitter 926 can transmit to the mobile devices 904 over a wired front link. Receiver 910 can receive information from one or more receive antennas 906 and is operatively associated with a demodulator 912 that demodulates received information. In addition, in an example, receiver 910 can receive from a wired backhaul link. Demodulated symbols are analyzed by a processor 914 that can be similar to the processor described above with regard to FIG. 8, and which is coupled to a memory 916 that stores information related to estimating a signal (e.g., pilot) strength and/or interference strength, data to be transmitted to or received from mobile device(s) 904 (or a disparate base station (not shown)), and/or any other suitable information related to performing the various actions and functions set forth herein.

Processor 914 can be further optionally coupled to a power-limited device determining component 918, which can be similar to power-limited device determining component 206, a resource allocation determining component 920, which can be similar to resource allocation determining component 208, and a resource allocating component 922, which can be similar to resource allocating component 210. Moreover, for example, processor 914 can modulate signals to be transmitted using modulator 924, and transmit modulated signals using transmitter 926. Transmitter 926 can transmit signals to mobile devices 904 over Tx antennas 908. Furthermore, although depicted as being separate from the processor 914, it is to be appreciated that the power-limited device determining component 918, resource allocation determining component 920, resource allocating component 922, demodulator 912, and/or modulator 924 can be part of the processor 914 or multiple processors (not shown).

Figure 10:
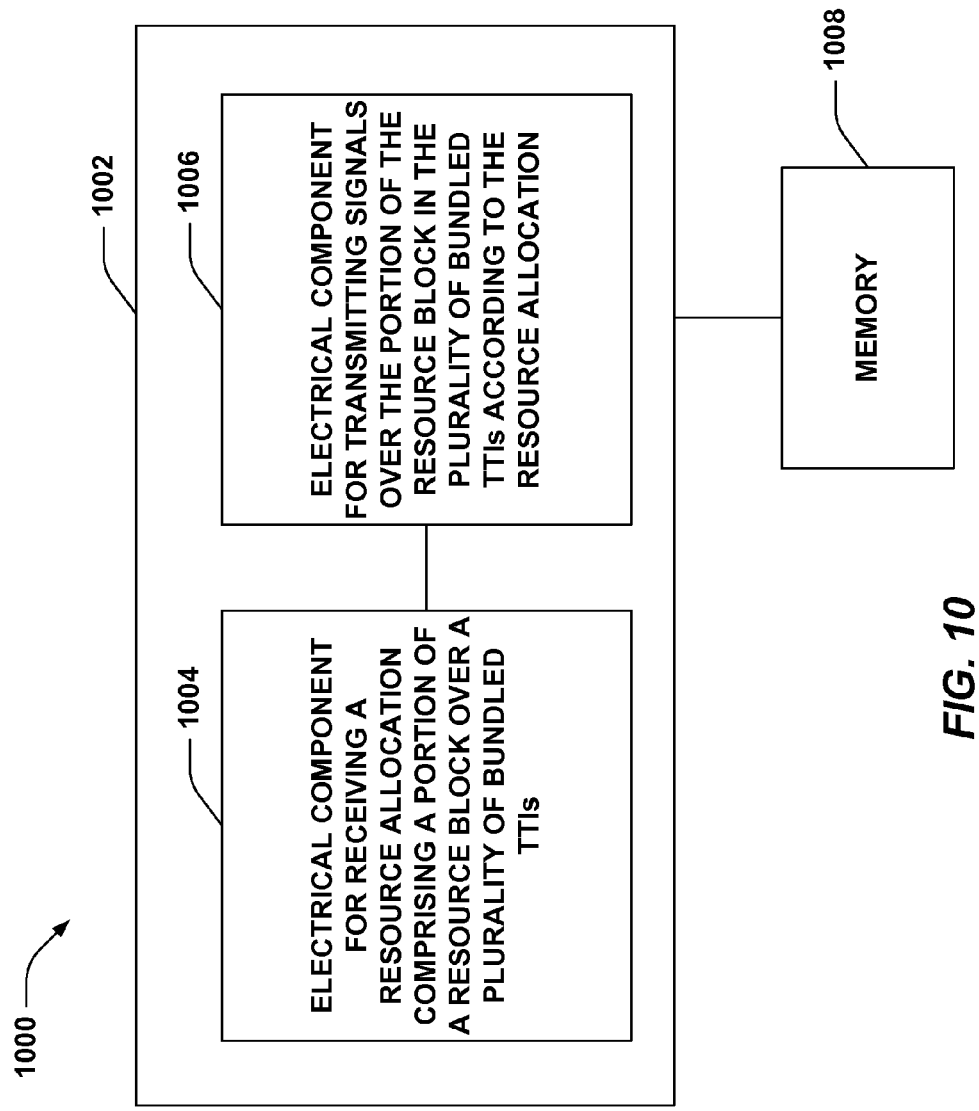
FIG. 10 illustrates an example system for utilizing a portion of a resource block for transmitting signals.

With reference to FIG. 10, illustrated is a system 1000 that utilizes a portion of a resource block for communicating in a wireless network. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving a resource allocation comprising a portion of a resource block over a plurality of bundled TTIs 1004.

Further, logical grouping 1002 can comprise an electrical component for transmitting signals over the portion of the resource block in the plurality of bundled TTIs according to the resource allocation 1006. For example, electrical component 1004 can include a resource allocation receiving component 212. In addition, for example, electrical component 1006, in an aspect, can include transmitting component 214. Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008.

In one example, electrical components 1004 and 1006 can comprise at least one processor, or each electrical component 1004 and 1006 can be a corresponding module of at least one processor. Moreover, in an additional or alternative example, electrical components 1004 and 1006 can be a computer program product comprising a computer readable medium, where each electrical component 1004 and 1006 can be corresponding code.

Figure 11:
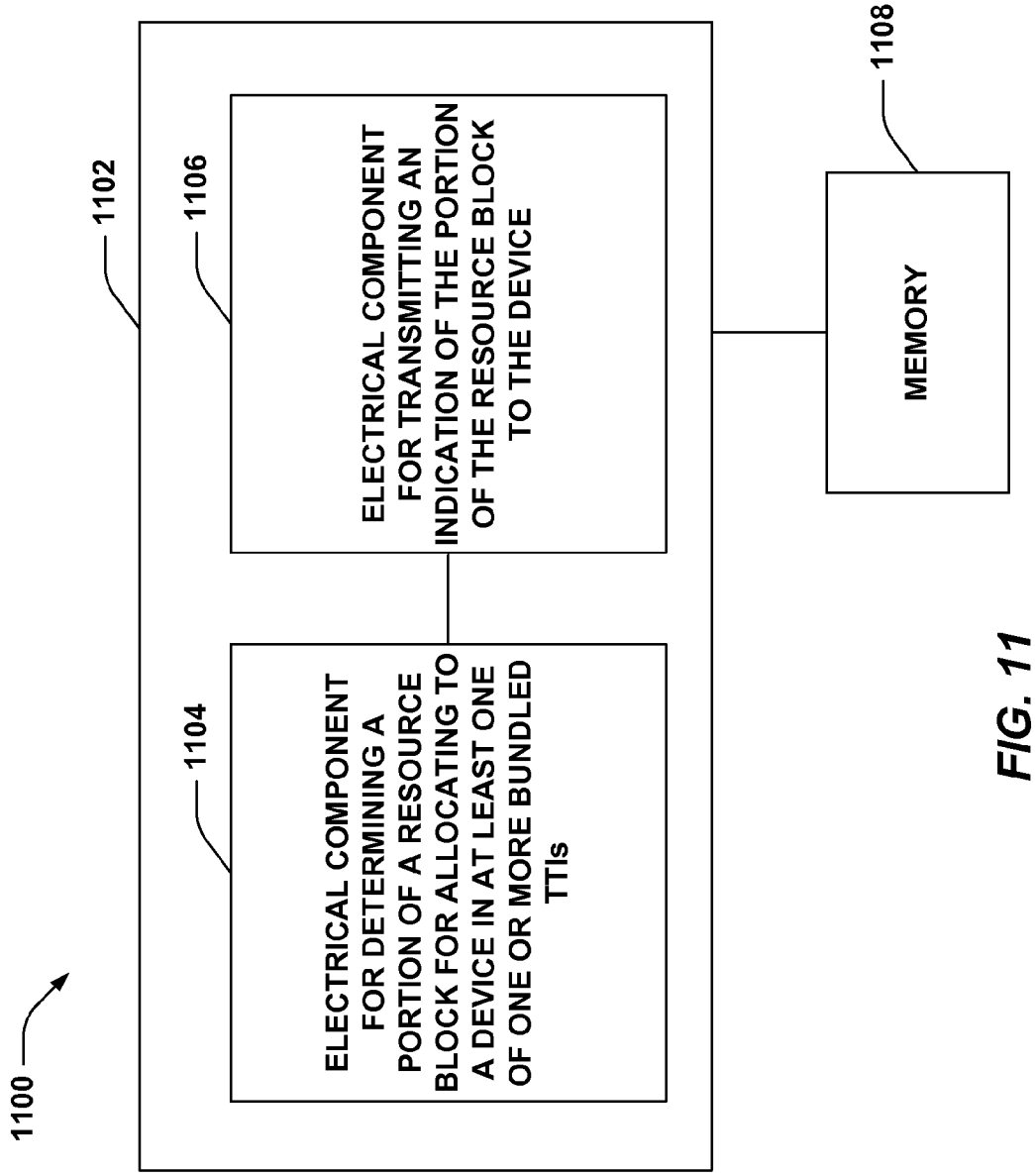
FIG. 11 illustrates an example system for allocating a portion of a resource block to a device.

With reference to FIG. 11, illustrated is a system 1100 that allocates a portion of a resource block to a device for communicating therewith. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining a portion of a resource block for allocating to a device in at least one or more bundled TTIs 1104. Further, logical grouping 1102 can comprise an electrical component for transmitting an indication of the portion of the resource block to the device 1106.

For example, electrical component 1104 can include a resource allocation determining component 208. In addition, for example, electrical component 1106, in an aspect, can include resource allocating component 210. Additionally, system 1100 can include a memory 1108 that retains instructions for executing functions associated with the electrical components 1104 and 1106. While shown as being external to memory 1108, it is to be understood that one or more of the electrical components 1104 and 1106 can exist within memory 1108.

In one example, electrical components 1104 and 1106 can comprise at least one processor, or each electrical component 1104 and 1106 can be a corresponding module of at least one processor. Moreover, in an additional or alternative example, electrical components 1104 and 1106 can be a computer program product comprising a computer readable medium, where each electrical component 1104 and 1106 can be corresponding code.

Figure 12:
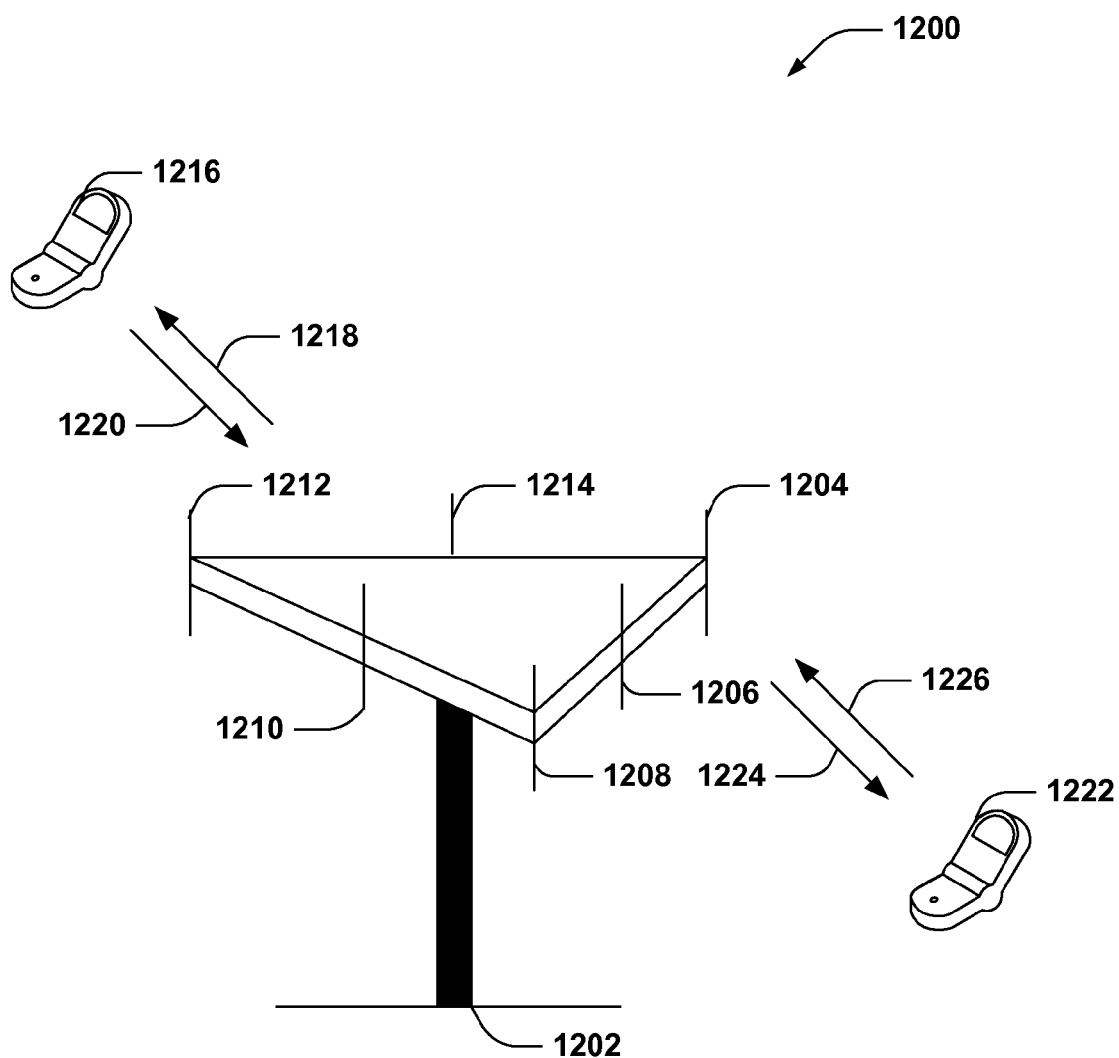
FIG. 12 illustrates an example wireless communication system in accordance with various aspects set forth herein.

Referring now to FIG. 12, a wireless communication system 1200 is illustrated in accordance with various embodiments presented herein. System 1200 comprises a base station 1202 that can include multiple antenna groups. For example, one antenna group can include antennas 1204 and 1206, another group can comprise antennas 1208 and 1210, and an additional group can include antennas 1212 and 1214. Two antennas are illustrated for each antenna group; however, more or fewer antennas can be utilized for each group. Base station 1202 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1202 can communicate with one or more mobile devices such as mobile device 1216 and mobile device 1222; however, it is to be appreciated that base station 1202 can communicate with substantially any number of mobile devices similar to mobile devices 1216 and 1222. Mobile devices 1216 and 1222 can be, for example, cellular phones, smart phones, laptops, handheld communication devices, handheld computing devices, satellite radios, global positioning systems, PDAs, and/or any other suitable device for communicating over wireless communication system 1200. As depicted, mobile device 1216 is in communication with antennas 1212 and 1214, where antennas 1212 and 1214 transmit information to mobile device 1216 over a forward link 1218 and receive information from mobile device 1216 over a reverse link 1220. Moreover, mobile device 1222 is in communication with antennas 1204 and 1206, where antennas 1204 and 1206 transmit information to mobile device 1222 over a forward link 1224 and receive information from mobile device 1222 over a reverse link 1226. In a frequency division duplex (FDD) system, forward link 1218 can utilize a different frequency band than that used by reverse link 1220, and forward link 1224 can employ a different frequency band than that employed by reverse link 1226, for example. Further, in a time division duplex (TDD) system, forward link 1218 and reverse link 1220 can utilize a common frequency band and forward link 1224 and reverse link 1226 can utilize a common frequency band.

Each group of antennas and/or the area in which they are designated to communicate can be referred to as a sector of base station 1202. For example, antenna groups can be designed to communicate to mobile devices in a sector of the areas covered by base station 1202. In communication over forward links 1218 and 1224, the transmitting antennas of base station 1202 can utilize beamforming to improve signal-to-noise ratio of forward links 1218 and 1224 for mobile devices 1216 and 1222. Also, while base station 1202 utilizes beamforming to transmit to mobile devices 1216 and 1222 scattered randomly through an associated coverage, mobile devices in neighboring cells can be subject to less interference as compared to a base station transmitting through a single antenna to all its mobile devices. Moreover, mobile devices 1216 and 1222 can communicate directly with one another using a peer-to-peer or ad hoc technology as depicted. According to an example, system 1200 can be a multiple-input multiple-output (MIMO) communication system.

Figure 13:
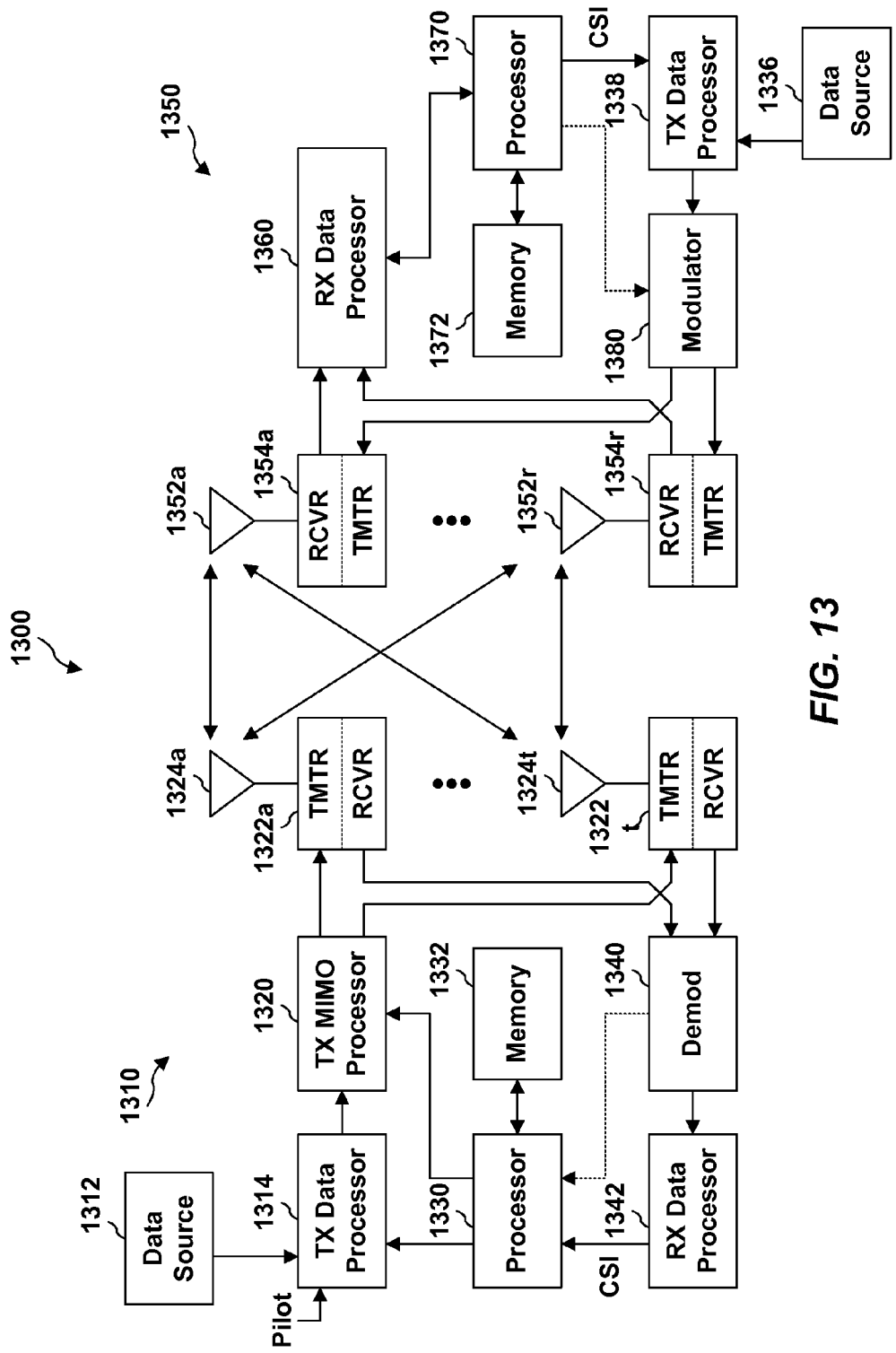
FIG. 13 illustrates an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-2 and 9-12), configured bandwidths (FIGS. 3-5), mobile devices (FIG. 8), and/or methods (FIGS. 6-7) described herein to facilitate wireless communication there between. For example, components or functions of the systems and/or methods described herein can be part of a memory 1332 and/or 1372 or processors 1330 and/or 1370 described below, and/or can be executed by processors 1330 and/or 1370 to perform the disclosed functions.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides NT modulation symbol streams to NT transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1322a through 1322t are transmitted from NT antennas 1324a through 1324t, respectively.

At mobile device 1350, the transmitted modulated signals are received by NR antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the NR received symbol streams from NR receivers 1354 based on a particular receiver processing technique to provide NT "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for communicating over allocated resources, comprising:
   receiving a resource allocation comprising a portion of a resource block over a plurality of bundled transmission time intervals, wherein the portion of the resource block comprises a subset of subcarriers in the resource block within the plurality of bundled transmission time intervals, and wherein a transmission bandwidth of a device receiving the resource allocation is limited to less than an entire bandwidth of the resource block; and
   transmitting signals over the portion of the resource block in the plurality of bundled transmission time intervals according to the resource allocation.

2. The method of claim 1, wherein the receiving the resource allocation includes receiving the resource allocation where the resource block or the portion of the resource block in the resource allocation is different in at least one of the plurality of bundled transmission time intervals than in another one of the plurality of bundled transmission time intervals.

3. The method of claim 1, wherein the receiving the resource allocation includes receiving the resource allocation where the resource block or the portion of the resource block in the resource allocation is different in at least a portion of at least one of the plurality of bundled transmission time intervals than in at least a different portion of the at least one of the plurality of bundled transmission time intervals.

4. The method of claim 1, wherein the receiving the resource allocation includes receiving the resource allocation where the plurality of bundled transmission time intervals of the resource allocation are different in one radio frame than in another radio frame.

5. The method of claim 1, further comprising:
receiving an indication of resources over which to receive feedback related to the signals transmitted over the portion of the resource block in the plurality of bundled transmission time intervals; and
receiving feedback over the resources.

6. An apparatus for communicating over allocated resources, comprising:
at least one processor configured to:
obtain a resource allocation comprising a portion of a resource block over a plurality of bundled time transmit intervals, wherein the portion of the resource block comprises a subset of subcarriers in the resource block within the plurality of bundled transmission time intervals, and wherein a transmission bandwidth of the apparatus is limited to less than an entire bandwidth of the resource block; and
transmit signals over the portion of the resource block in the plurality of bundled transmission time intervals according to the resource allocation; and
a memory coupled to the at least one processor.

7. The apparatus of claim 6, wherein the resource block or the portion of the resource block in the resource allocation is different in at least one of the plurality of bundled transmission time intervals than in another one of the plurality of bundled transmission time intervals.

8. The apparatus of claim 6, wherein the resource block or the portion of the resource block in the resource allocation is different in at least a portion of at least one of the plurality of bundled transmission time intervals than in at least a different portion of the at least one of the plurality of bundled transmission time intervals.

9. The apparatus of claim 6, wherein the plurality of bundled transmission time intervals of the resource allocation are different in one radio frame than in another radio frame.

10. The apparatus of claim 6, wherein the at least one processor is further configured to:
receive an indication of resources over which to receive feedback related to the signals transmitted over the portion of the resource block in the plurality of bundled transmission time intervals; and
receive feedback over the resources.

11. An apparatus for communicating over allocated resources, comprising:
means for receiving a resource allocation comprising a portion of a resource block over a plurality of bundled transmission time intervals, wherein the portion of the resource block comprises a subset of subcarriers in the resource block within the plurality of bundled transmission time intervals, and wherein a transmission bandwidth of the apparatus is limited to less than an entire bandwidth of the resource block; and
means for transmitting signals over the portion of the resource block in the plurality of bundled transmission time intervals according to the resource allocation.

12. The apparatus of claim 11, wherein the resource block or the portion of the resource block in the resource allocation is different in at least one of the plurality of bundled transmission time intervals than in another one of the plurality of bundled transmission time intervals.

13. The apparatus of claim 11, wherein the resource block or the portion of the resource block in the resource allocation is different in at least a portion of at least one of the plurality of bundled transmission time intervals than in at least a different portion of the at least one of the plurality of bundled transmission time intervals.

14. The apparatus of claim 11, wherein the plurality of bundled transmission time intervals of the resource allocation are different in one radio frame than in another radio frame.

15. The apparatus of claim 11, further comprising means for receiving feedback related to the signals transmitted, wherein the means for receiving the resource allocation further receives an indication of resources over which the feedback is received.

16. A computer program product for communicating over allocated resources, comprising a non-transitory computer-readable medium, the non-transitory computer-readable medium comprising:
code for causing at least one computer to obtain a resource allocation comprising a portion of a resource block over a plurality of bundled time transmit intervals, wherein the portion of the resource block comprises a subset of subcarriers in the resource block within the plurality of bundled transmission time intervals, and wherein a transmission bandwidth of the computer is limited to less than an entire bandwidth of the resource block; and
code for causing the at least one computer to transmit signals over the portion of the resource block in the plurality of bundled transmission time intervals according to the resource allocation.

17. The computer program product of claim 16, wherein the resource block or the portion of the resource block in the resource allocation is different in at least one of the plurality of bundled transmission time intervals than in another one of the plurality of bundled transmission time intervals.

18. The computer program product of claim 16, wherein the resource block or the portion of the resource block in the resource allocation is different in at least a portion of at least one of the plurality of bundled transmission time intervals than in at least a different portion of the at least one of the plurality of bundled transmission time intervals.

19. The computer program product of claim 16, wherein the plurality of bundled transmission time intervals of the resource allocation are different in one radio frame than in another radio frame.

20. The computer program product of claim 16, wherein the computer-readable medium further comprises:
code for causing the at least one computer to receive an indication of resources over which to receive feedback related to the signals transmitted over the portion of the resource block in the plurality of bundled transmission time intervals; and
code for causing the at least one computer to receive feedback over the resources.

21. An apparatus for communicating over allocated resources, comprising:
a resource allocation receiving component for obtaining a resource allocation comprising a portion of a resource block over a plurality of bundled transmission time intervals, wherein the portion of the resource block comprises a subset of subcarriers in the resource block within the plurality of bundled transmission time intervals, and wherein a transmission bandwidth of the apparatus is limited to less than an entire bandwidth of the resource block; and a transmitting component for transmitting signals over the portion of the resource block in the plurality of bundled transmission time intervals according to the resource allocation.

22. The apparatus of claim 21, wherein the resource block or the portion of the resource block in the resource allocation is different in at least one of the plurality of bundled transmission time intervals than in another one of the plurality of bundled transmission time intervals.

23. The apparatus of claim 21, wherein the resource block or the portion of the resource block in the resource allocation is different in at least a portion of at least one of the plurality of bundled transmission time intervals than in at least a different portion of the at least one of the plurality of bundled transmission time intervals.

24. The apparatus of claim 21, wherein the plurality of bundled transmission time intervals of the resource allocation are different in one radio frame than in another radio frame.

25. The apparatus of claim 21, further comprising a feedback receiving component for receiving feedback related to the signals transmitted, wherein the resource allocation receiving component further receives an indication of resources over which the feedback is received.

* * * * *